United States Patent [19]

Woodacre

[11] 4,092,517

[45] May 30, 1978

[54] ELECTRIC ARC WELDING PROCESSES AND APPARATUS THEREFOR

[75] Inventor: Albert Woodacre, Cleveleys, England

[73] Assignee: United Kingdom Atomic Energy Authority, England

[21] Appl. No.: 661,363

[22] Filed: Feb. 25, 1976

[30] Foreign Application Priority Data

Mar. 6, 1975 United Kingdom ............... 9473/75

[51] Int. Cl.² ............................................. B23K 9/10
[52] U.S. Cl. ........................ 219/137 PS; 219/130.21
[58] Field of Search ............ 219/137 PS, 135, 131 R, 219/131 WR

[56] References Cited

U.S. PATENT DOCUMENTS

| | | | |
|---|---|---|---|
| 3,068,352 | 12/1962 | Correy | 219/137 PS |
| 3,296,413 | 1/1967 | Steinert | 219/135 |
| 3,300,683 | 1/1967 | Weishaar | 219/137 PS |
| 3,330,933 | 7/1967 | Maklary | 219/135 |
| 3,382,345 | 5/1968 | Normando | 219/135 |
| 3,496,327 | 2/1970 | Vilkas | 219/131 R |
| 3,598,954 | 8/1971 | Iceland et al. | 219/131 R |
| 3,679,865 | 7/1972 | Jesnitzer et al. | 219/131 R |
| 3,894,210 | 7/1975 | Smith et al. | 219/137 PS |

Primary Examiner—J. V. Truhe
Assistant Examiner—Clifford C. Shaw
Attorney, Agent, or Firm—Larson, Taylor and Hinds

[57] ABSTRACT

There is provided a method and apparatus for electric-arc welding, in which an alternating current of positive and negative pulses is supplied to produce an electric arc between a welding electrode and a workpiece. The ratio of the durations of the positive and negative pulses of welding current is arranged to be changed in response to a signal from a sensing device adapted to sense a change in a characteristic of the electric arc so as to provide optimum welding current for changed welding conditions. The ratio of the amplitudes of the positive and negative pulses may also be varied in response to a signal from a sensing means.

14 Claims, 12 Drawing Figures

ELECTRIC ARC WELDING PROCESSES AND APPARATUS THEREFOR

BACKGROUND OF THE INVENTION

This invention relates to electric arc-welding processes and apparatus therefor, and more particularly to inert gas-shielded arc-welding processes and apparatus.

In inert gas-shielded arc-welding, a weldpool is produced in a welding zone on the workpiece by the heating effect produced by an electric arc struck between a welding electrode in a holder and the workpiece. The weld pool is shielded from contamination by the blanketing effect of an inert gas, such as helium or argon. Either direct current or alternating current may be used to provide the welding current depending to a large extent on the nature of the material to be welded.

Direct current welding is usually carried out with the welding electrode negative, less heat being generated in the electrode than in the positive workpiece. When welding with the welding electrode positive, more heat is generated in the electrode but a "scouring" action is produced on the surface of the workpiece, which makes it possible to weld materials such as aluminium which readily acquire a oxide film.

Welding with conventional alternating current derived, for example, through a transformer from a mains 50 or 60 cycles per second supply, or an engine driven alternator, combines in one cycle, or repetition period, a negative pulse of current for one half-cycle and a positive pulse of current for the other half-cycle. Alternating current is therefore usually used for welding materials such as aluminium by the gas-shield arc-welding process since it combines the features of both electrode positive and electrode negative welding.

SUMMARY OF THE INVENTION

According to one aspect of the present invention, in an electric-arc welding process in which an alternating current of positive and negative pulses is supplied to produce an electric arc between a welding electrode and a workpiece, the process comprises sensing with a sensing means a characteristic of the electric arc and/or the arcing region, which characteristic changes as welding conditions at the electric arc change and said sensing means being adapted to provide a signal on the occurrence of said changes, and varying the widths of the positive and/or negative pulses of current in response to said signal so as to provide optimum pulse widths for said changed welding conditions.

According to another aspect of the present invention, in an electric arc-welding process in which an alternating current of positive and negative pulses is supplied to a welding electrode to produce an electric arc between the said electrode and a workpiece, the process comprises monitoring directly or indirectly with a sensing means a characteristic in the electric arc and/or the arc region to generate a signal from the sensing means on the occurrence of changes in the welding conditions, and which characteristic changes as welding conditions of the electric arc change, comparing the generated signal with a reference signal in a comparing means to provide an output from the comparing means to an alternating current pulse width control means in response to any difference between the two signals, and varying the widths of the positive and/or negative pulses of current supplied to the welding electrode in response to said output to bring the varying generated signal and the reference signal substantially in balance.

According to a further aspect of the present invention apparatus for electric arc-welding from an alternating current of positive and negative pulses, comprises a power source means for providing a direct current supply, a reversing switching means to which the direct current is to be supplied, a control means for controlling both the switching position and the dwell time of the reversing switching means, so that in operation an alternating current of positive and negative pulses is supplied by the reversing switching means to a welding electrode, in which alternating current the widths of the positive and/or negative pulses may be varied by the control means, a sensing means for monitoring directly or indirectly a characteristic of the electric arc and/or the arc region between the welding electrode and a workpiece to generate a signal on the occurrence of changes in the welding conditions, which characteristic changes as welding conditions at the electric arc change, a comparing means for comparing the generated signal with a reference signal and providing an output in response to any difference between the two signals to the control means, the said control means being so arranged that in operation in response to said output it alters the dwell time of the reversing switching means and thereby the width of the positive and/or negative pulses to bring the varying generated signal and the reference signal substantially in balance.

The sensing means may directly monitor the electric arc for example, by monitoring the audio-frequency of the electric arc between the welding electrode and the workpiece, or the thermal emission at the back of the weld, or may indirectly monitor the electric arc by monitoring either the current supplied to the electric arc through the current conductor supply leads to the welding electrode or the workpiece, or "out-of-phase" pulses in said current supply leads.

Preferably, the process and apparatus therefor are so arranged that the polarity and width of the initial pulse to be supplied to produce the electric arc at the start of the welding operation may be selected independently of the subsequent pulses having the same polarity.

Desirably, the alternating current in each of the above-described aspects of the invention is of square-wave form, and the direct current supply is arranged to be floating with respect to earth.

Means for varying the amplitude (current) of the positive and negative pulses independently of each other may be incorporated in either of the aforedescribed forms of the invention.

It will be appreciated that conventional spark starters and surge injectors may be used to assist arc initiation and the maintenance of the arc during the transition from negative to positive pulses.

The invention has particular advantages in gas-shielded arc-welding using a tungsten non-consumable welding electrode, hereinafter referred to as "TIG welding".

BRIEF EXPLANATION OF THE DRAWINGS

In order to enable the invention to be more readily understood, attention is directed by way of example only to the accompanying drawings in which.

DETAILED DESCRIPTION OF THE INVENTION

Figure 1:
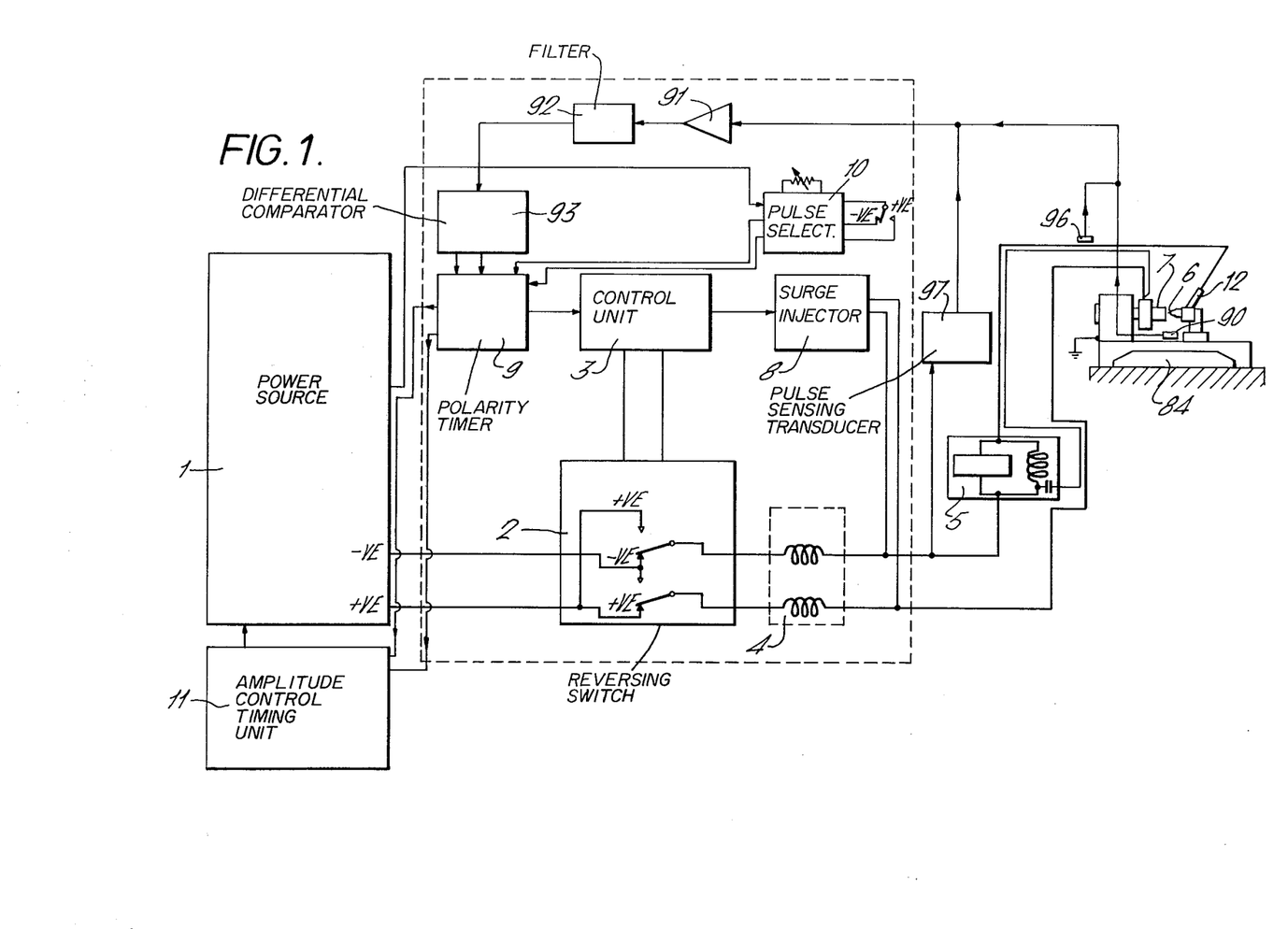
FIG. 1 shows a block schematic diagram of a TIG welding apparatus incorporating the invention in a typical set-up with a workpiece, a welding electrode and a manipulator.

Referring now to FIG. 1 and considering initially the apparatus to provide the welding current, a TIG welding apparatus comprises a power source 1 with the earth connection removed for supplying a direct current which is floating with respect to earth, a reversing switch 2 in the form of a solid state inverter to which the direct current is to be supplied, and a control unit 3 for controlling the switching position and the dwell time for each position of the reversing switch 2. One output terminal from the reversing switch 2 connects in series through a surge blocking choke 4 and a spark starter 5 to a TIG welding electrode 6, and the other output terminal connects through the surge blocking choke 4 to a workpiece 7. A surge injector unit 8 is placed in parallel across the output from the reversing switch 2, its timing being controlled by the control unit 3.

A polarity timer unit 9 is arranged to receive an input from an initial pulse selection unit 10, and to provide as an output to the control unit 3 a signal which determines the initial switching position and dwell time of the reversing switch 2 selected by the control unit 3 independently of the dwell times of the subsequent pulses supplied by the reversing switch 2. The signal from the pulse selection unit 10 may be varied to enable variation of the dwell time and polarity of the initial pulse provided by the reversing switch 2 to be effected. An amplitude timing unit 11 is connected to the power source 1 and polarity timer unit 9, and provides independent amplitude control of both the positive and negative pulses. The welding electrode 6 is held in an electrode holder 12.

In operation, the current supplied by the power source 1 is "chopped" and repeatedly inverted by the reversing switch 2 to provide an alternating current of square-wave form. The welding electrode 6 and workpiece 7 experience square-wave alternating current having the property that the widths of both the positive and negative pulses of the square-wave alternating current can be varied independently of one another through the action of the control unit 3 in controlling the dwell time of the reversing switch 2. The amplitude of this current can be varied by the amplitude control unit 11.

At the start of a welding operation, the initial position of the reversing switch 2 and the dwell time in that position may be selected by the initial pulse selection unit 10. The spark starter unit 5 is synchronised to deliver a pulse of current to facilitate ionisation of the gap between the welding electrode 6 and the workpiece 7 so that a current can flow to establish an electric arc. Once the arc has been established, the surge injector unit 8 fires a pulse of energy on each transition from negative to positive pulses, to maintain an electric arc and obviate possible difficulties in re-establishing the arc when the alternating current passes through a null point.

Figure 2A:
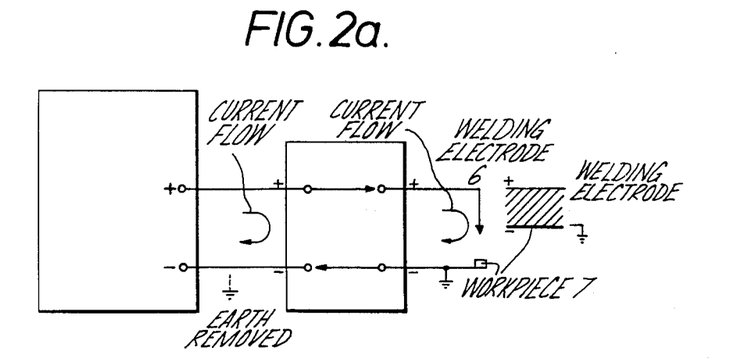
FIGS. 2a, 2b and 2c, show diagrammatically the operation of a reversing switch in the apparatus described in FIG. 1.
Figure 2B:
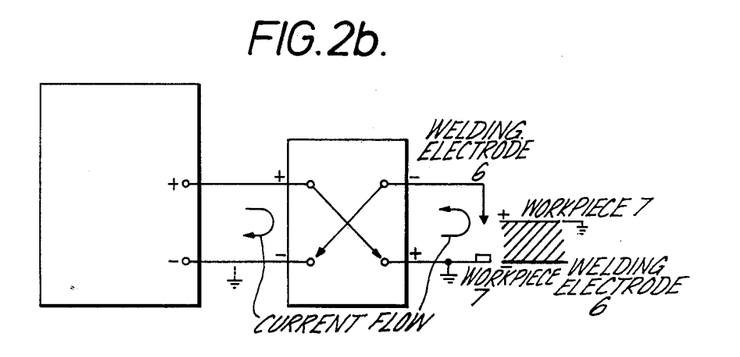
Figure 2C:
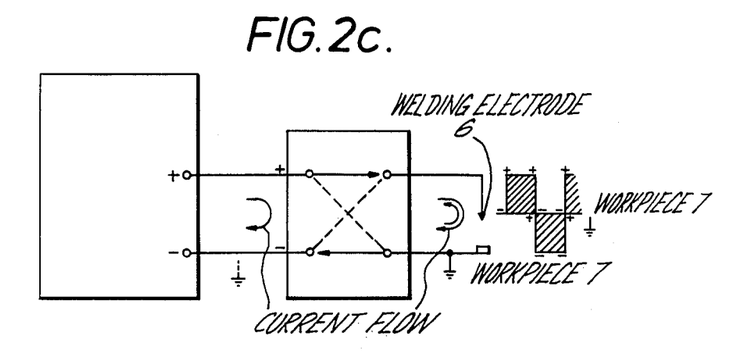

The operation of the reversing switch 2 is shown diagrammatically in FIGS. 2a . . . 2c, and referring to these figures, FIG. 2a shows the reversing switch 2 in a first position, the welding electrode 6 being made positive and the workpiece 7 negative, the waveform beings as shown. FIG. 2b shows the reversing switch 2 in its alternative position, the welding electrode 6 then being made negative and the workpiece 7 positive, the waveform again being shown. FIG. 2c shows the effect of switching the reversing switch 2 between the first position and the alternative position, the welding electrode 6 and workpiece 7 experiencing a square-wave alternating current, the shape of the waveform depending on the dwell time of the reversing switch 2 in each of the said positions. The waveform shown in FIG. 2c is symmetrical indicating a uniform repetition rate of the reversing switch 2 in switching between the said positions.

Figure 3A:
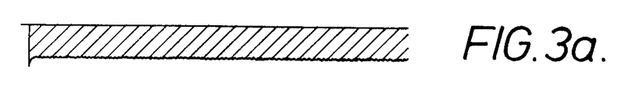
FIGS. 3a . . . 3g show examples of waveforms of the current supplied by the apparatus described in relation to FIG. 1.
Figure 3B:
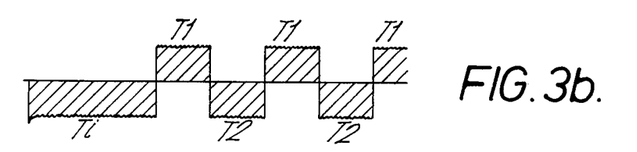
Figure 3C:
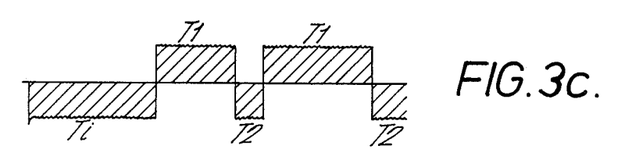
Figure 3D:
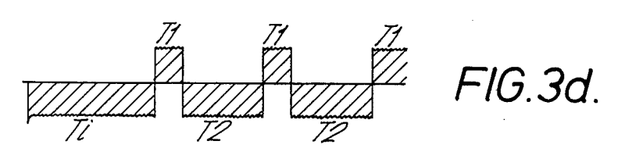
Figure 3E:
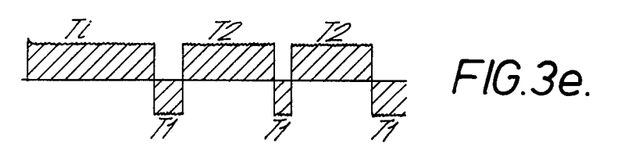
Figure 3F:
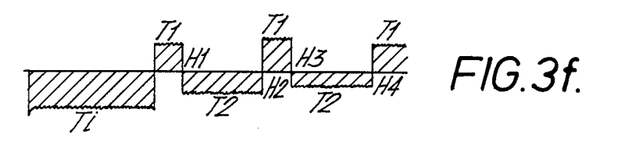

Referring now to FIGS. 3a . . . 3g, FIG. 3a shows the waveform of the floating direct current output from the power source 1, whilst FIGS. 3b . . . 3g show waveforms of the square-wave alternating current supplied by reversing switch 2. In FIG. 3b, after an initial negative pulse Ti, the pulse widths T1 and T2 are of equal length. FIG. 3c differs from FIG. 3b in that pulse T1 is greater than T2. In FIG. 3d the initial pulse Ti is positive, and T1 is shorter than T2 but of opposite polarity to that shown in FIGS. 3b and 3c. FIG. 3f shows the affect that pulse amplitude control unit 11 can effect on pulse height, H1 being greater than H2 H3 greater than H1, and H2 greater than H4.

Figure 3G:
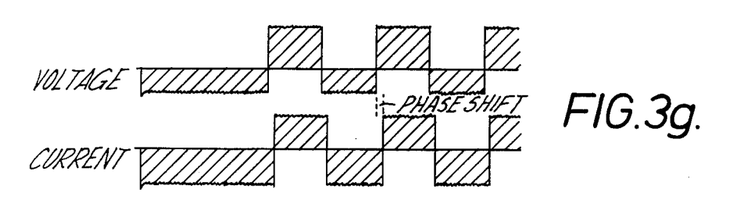

The effect of varying the pulse width, polarity, duration, and polarity of the initial pulse, with pulse height variations introduced by pulse amplitude control can readily be seen from these figures. FIG. 3g shows the phase-shift between voltage and current as a result of the switching action.

Considering now the use of the feedback control provided by the sensing means so that the aforedescribed apparatus becomes self-adaptive to ensure that optimum pulse widths are maintained as far as possible to suit changes in welding conditions, and referring again to FIG. 1, a sensing means in the form of a piezoelectric transducer 90 generates a signal related to a characteristic of the electric arc and/or the arc region in the form of the audiofrequency of the arc. Alternatively, a pulse sensing transducer 97, or an infra-red detector (not shown) may be used to monitor a characteristic of the electric arc by monitoring the out-of-phase pulses in the current conductor leads to the welding electrode, or the thermal emission at the back of the weld respectively. A further transducer device is indicated at 96 which may take one of the forms described. The signal is amplified by amplifier 91, filtered by filter 92 to remove background noise and fed to a differential comparing means 93 which is provided with a reference signal obtained under and representing optimum welding conditions in the electric arc. The differential comparing means 93 is arranged to compare the generated signal with the reference signal to provide an output to the polarity timer unit 9 related to the difference between the two signals to cause the polarity timer unit 9 to alter the widths of the positive and/or negative pulses to bring the varying generated signal and the reference signal substantially in balance, thereby providing optimum pulse widths for changed welding conditions.

The signal from a sensing means may similarly be used to provide an output from the timing unit 11 to control the amplitude of the current supplied to the electric arc.

Figure 4:
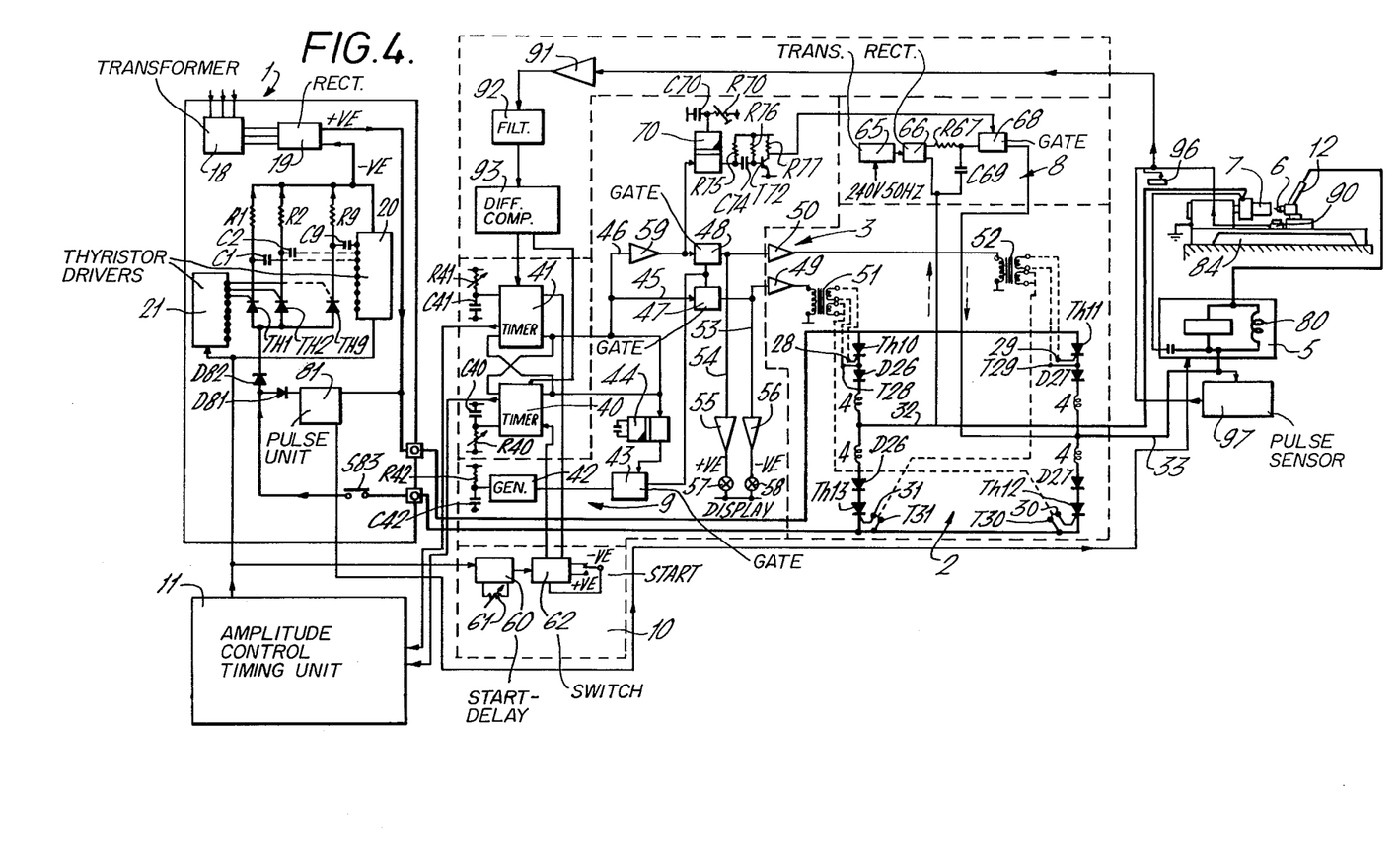
FIG. 4 shows a circuit diagram of one form of TIG welding apparatus which incorporates the invention.

Considering the circuit of the TIG welding apparatus in more detail, and referring now to FIG. 4, the power source 1 is provided for connection to a 3 phase 415 volts alternating current supply and comprises a star-delta transformer 18, and a 3-phase bridge rectifier 19 to provide open circuit voltages of 75v to 85v. The positive output from the rectifier 19 connects to one side of a solid state inverter provided as the reversing switch 2. The negative output connects to a parallel bank of thyristors Th1, Th2, . . . Th9, with associated resistive elements R1, R2, . . . R9 respectively. The firing and switching-off of the thyristors Th1 . . . Th9 is arranged by conventional commutating circuits having a current "off" driver unit 20, and current "on" unit 21. The gate terminal of each thyristor Th1 . . . Th9 is connected to the current-on unit 21, and connections from the current "off" driver 20 are provided to tapping points between each thyristor Th1 . . . Th9 and resistor R1 . . . R9. A capacitor C1 . . . C9 respectively is in series with each connection from the current "off" driver unit 20 to the tapping points. By firing particular thyristors Th1 . . . Th9 the level of current supplied can be varied by increasing or reducing the level of the resistance in the circuit. The negative output when connects to the other side of the reversing switch 2.

The timing unit 11 is responsive to the polarity timer 9 and controls the current "off" driver unit 20, current "on" unit 21 and thereby the switching of thyristors Th1 . . . Th9. This switching may be arranged at a symmetrical or non-symmetrical rate in phase with the operation of the reversing switch 2 (FIG. 1) to provide pulse amplitude control (see FIG. 3f) of the current supplied to the workpiece 7 and welding electrode 6.

The reversing switch 2 comprises a bank of four thyristors Th10 . . . Th13 connected in two lines 26 and 27 in parallel, with thyristors Th10 and Th13 connected in series in line 26, and thyristors Th11 and Th12 connected in series in line 27. Thyristors Th10 . . . Th13 have gate terminals 28, 29, 30 and 31 respectively, and tapping points T28, T29, T30 and T31 respectively from a commutating circuit (not shown). An output line 32 from the mid-point of line 26 connects to the workpiece 7, whilst the output line 33 from the mid-point of line 27 connects initially to the spark starter 5 and then to the welding electrode holder 12 and welding electrode 6. Surge blocking chokes 4 and diodes D26 and D27 respectively suppress transient voltages in each half of lines 26 and 27.

The timing and therefore the dwell time of each thyristor Th10 . . . Th13 is controlled by the polarity timer 9 having timer units 40 and 41 to which the differential comparing means 93 connects. Essentially the polarity timer 9 comprises a pulse generator 42, having capacitor C42 and resistor R42 as a fixed time constant, connected to a gate 43, and the timer units 40 and 41 having variable resistors R40 and R41 respectively, and capacitors C40 and C41, as variable time constants. From each of the timer units 40 and 41, one terminal connects to a monostable unit 44, another terminal connects to parallel lines 45 and 46, and a third terminal connects to timing unit 11. The output from gate 43 connects between gates 47 and 48 in lines 45 and 46 which subsequently connect through amplifiers 49 and 50 with pulse transformers 51 and 52 used by the commutating curcuit (not shown) for switching thyristors Th10 . . . Th13 on and off. An inverter 59 introduces phase shift between the pulses received in line 46 relative to those in line 45. Tapping leads 53 and 54 from lines 45 and 46 connect through amplifiers 55 and 56 to display lights 57 and 58 to indicate the polarity of the pulse selected.

The initial pulse width and polarity is selected by the initial pulse selection unit 10 which comprises a capacitative start-delay unit 60, with a shunt variable potentiometer 61 connected to a polarity selector switch 62. The positive output signal from the polarity selector switch 62 connects to the timer unit 40 whilst a negative output signal connects to timer unit 41. When the initial pulse selection unit 10 is engaged, its output changes the setting of the timer units 40 and 41 until its output is cancelled by an output from the start delay unit 60 after a preselected delay time.

The surge injector unit 8 comprises a 240v 50 cycle transformer 65 connected to a rectifier 66. The positive output from the rectifier 66 connects to a gate 68 and joins line 27 and output line 33. The negative output from rectifier 66 connects to the output line 32 from line 26. A capacitor C69 is arranged in parallel between the output lines from rectifier 66. A tapping from line 46 connects through a monstable unit 70, with a variable time constant provided by variable resistor R70 and capacitor C70, to a transistor T72 with capacitor C74 in series and shunt resistors R75, R76, R77, and finally to gate 68. The timing of the surge injector unit 8 is therefore phased with the timing of the reversing switch 2 by the polarity timer 9 such that is delivers a pulse of current during the period between the switching-off of one pair of thyristors Th10 and Th12, and the switching-on of the other pair Th11 and Th13.

The spark starter 5 is used in a conventional manner to facilitate ionisation of the gap between the welding electrode 6 and the workpiece 7. The spark starter 5 is a one-shot device generating a single high voltage spike. Extensive filtering of the mains supply, the choke 80, and sitting of the spark starter 5 remotely from the workpiece 7, reduces to an acceptable minimum the electrical interference generated by the resulting spark. The amplitude and width of the spike is determined by the resistance of the leads to the welding electrode holder 12 and workpiece 7. It is typically 7kV and in the microsecond range.

An elevated high voltage pulse unit 81 is provided in the power source 1, and is connected in parallel between the output lines of the power source 1 to reinforce with a high energy pulse the ionisation produced by the spark starter 5. The elevated voltage pulse unit 81 is not normally required but is beneficial when a shroud gas such as helium is used. It is energised from a 240v single phase alternating current supply (not shown), and its pulse voltage is variable from zero to −300v giving an output current of 70A peak falling to 5A in approximately 10 milliseconds. The elevated voltage pulse unit 8 incorporates various conventional suppression devices (not shown) to nullify the effects of interference. The diode D82 protects the thyristors Th1 . . . Th9 from high reverse voltages. Diode D81 isolates the elevated voltage pulse unit 81 from the lines carrying the welding current from the power source 1 after the elevated voltage pulse has been delivered, to prevent the elevated voltage pulse unit 81 from being short circuited by the welding current. Switch S83 is inserted to the negative line to the thyristors Th1 . . . Th9 for making and breaking the circuit.

Considering now the operation of the circuit shown in FIG. 4 with a workpiece 7 positioned in a welding manipulator 84, the initial pulse selection unit 10 is set at the polarity and dwell time of the initial pulse required, using the variable potentiometer 61 of the start-delay unit 60, and polarity selector switch 62. The timer units 40 and 41 are set to provide the positive and negative pulse widths required at the welding electrode 6 and workpiece 7 for optimum welding conditions and the timing unit 11 is set at the pulse amplitudes of the positive and negative pulses required. When switch S83 is depressed, one of the timer units 40 and 41, selected by the initial polarity unit 10 is initiated by a circuit (not shown) and delivers a pulse to the monostable unit 44, which provides a pulse to gate 43, and lines 45 and 46 respectively. Gate 43 normally open is momentarily closed by the action of the monostable unit 44. This removes from gates 47 and 48 the pulses being generated by pulse generator 42 and allows gates 47 and 48 to open to pass pulses in lines 45 and 46. The profile of the pulse in line 46 is the inverse of that in line 45 because of the action of inverter 59. Thus when gate 47 passes a pulse of current in line 45, no pulse is passed in gate 48 and vice versa. Consequently, the timing units 40 and 41 are so synchronised in timing of operation with the pulses delivered to lines 45 and 46 that selection of the appropriate timing unit 40 and 41 passes a pulse through the required gate 47 or 48, and thereby to pulse transformers 51 or 52 respectively, which then supply pulses to thyristors Th10 ... Th13 respectively. The selected thyristors Th10 and Th12 or Th11 and Th13 become conducting and allow a current to flow in the output lines 32 and 33 from the reversing switch 2. The spark starter 5 is synchronised to fire and initiate an electric arc between the welding electrode 6 and the workpiece 7. The elevated voltage unit 81, if required, is also synchronised to fire at the same time as the spark starter 5. The polarity of the welding current at the electric arc is held until the capacitative start-delay unit 60 is charged and delivers a pulse to switch-off the select initial polarity unit 62, whereupon the timer units 40 and 41 are initiated to provide sequential pulses to alternately switch thyristors Th10 and Th12, and Th11 and Th13, on and off through lines 45 and 46, gate terminals 28 .. . 32, and tapping points T28 ... T31. The surge injector 8 is energised and delivers a pulse to output line 32 and line 27 when gate 68 becomes open on being initiated by the pulses in line 46.

The signals received by the differential comparing means 93 from the sensing means used to monitor a characteristic of the electric arc are compared with its reference signal, whereupon it provides an output to change the settings of the timer units 40 and/or 41 on the occurrence of any imbalance in the two signals, thereby to change the timing of the firing of thyristors Th10 . . . Th13 and consequently the widths of the negative and/or positive pulses. Naturally the settings of the timer units 40 and 41 may be changed manually during the welding operation, but is unlikely that an operator would be able to respond as quickly if at all to the changes in the welding conditions as the aforedescribed self-adaptive apparatus.

Similarly the amplitude of the pulses of positive and negative current may be varied in response to a signal from a sensing means by adjustment of the timing unit 11 which controls the firing of thyristors Th1 ... Th9 in the power source 1.

The differential comparing means may also be programmed to switch-off the welding current in the event of some gross discontinuity in the material to be welded giving rise to such a change in the electric arc as likely to lead to a defective weld.

It can be seen that the invention permits the optimum ratio of "scouring action" provided by the positive pulses, relative to the main welding current provided by the negative pulses, to be selected to suit different materials and welding set-up conditions, such as surface condition, gap between the workpieces to be welded, and surface contamination and for the ratio to be changed automatically as welding conditions change. For example, the ratio could be arranged so that the positive pulse width is only a low percentage of the width of the negative pulse, and for this ratio to be varied with changing welding conditions. It can easily be appreciated that using the aforementioned conventional alternating current for welding, where the positive and negative pulses are each a half-cycle of equal duration, does not provide the inherent flexibility of the invention, where the pulse width or time duration of the positive and/or negative pulse may be varied as a feature of a self-adaptive process.

Although the invention has been described in relation to the generation of a square-wave alternating current, alternative waveforms, such as "sawtooth" having variable pulse widths may be used depending on the application.

The invention may also be incorporated in alternative forms of apparatus, and such apparatus may, for example, use an alternative inverter as the reversing switch 2 with appropriate timing and switching arrangements.

Alternative sensing means, and a combination of different sensing means may be used, each one monitoring a different characteristic of the electric arc and generating a signal used to control a different parameter of the electric arc.

With regard to the pulse sensing transducer 97, it has been found that thermal changes which may arise from imperfections in the material of the workpiece 7 can produce out-of-phase pulses in the conductor carrying current to the welding electrode holder 12. By using the pulse sensing transducer 97 which incorporates a discriminator and filter (not shown) to detect these out-of-phase pulses, a feedback signal can be derived and utilised by a differential comparing means as hereinbefore described.

The invention is particularly suitable for incorporation in a computer controlled automatic welding machine, and in such a machine the operation of, for example, the polarity timer 9, control means 3, power source 1, and the timing unit 11, could be controlled by the computer, and the transducers 90, 96, or 97 respectively, for example, used to adjust this control to suit changes in welding conditions, and naturally may be combined with the control of other welding parameters such as welding speed, and inert gas supply. An example of an automatic welding machine is described in ATOM No 195 pp (20–34) by D. White, A. Woodacre and A. F. Taylor, published in 1973 by the United Kingdom Atomic Energy Authority, London. The invention has applications in the welding of nuclear components and some aspects of the welding of nuclear materials were reviewed in the Dr. Comfort A. Adams Lecture presented by Dr. R. W. Nichols to the American Welding Institute in 1975 including the work of Smith and Boughton CEGB Marchwood Laboratories, England, and reference is directed to the transcript of this lecture for further detailed information.

It will be appreciated that as well as obtaining a reference signal from optimum welding conditions, variations can be introduced to the welding conditions, such as dimensional tolerances, material composition, and contamination, likely to give rise to unsatisfactory welds at that pulse width of the welding current used and the signal obtained from the sensing means recorded and used in the differential comparing means or computer as a memory and a guide to the corrective action necessary to the pulse widths of the current to re-establish an arc likely to provide a satisfactory weld.

The invention also includes a method of controlling an electric arc, for example, between a welding electrode and a workpiece, which method comprises monitoring with a sensing means a conductor carrying current to the electric arc for out-of-phase pulses therein produced from changes in the electric arc to generate a signal from the sensing means in response to said pulses, comparing the generated signal with a reference signal in a comparing means to provide an output related to the difference between said signals, and changing a parameter of said current in response to said output so as to substantially reduce the production of said out-of-phase pulses.

The invention has been described in relation to TIG welding, but it also has applications in other welding processes such as, for example, metal inert gas (MIG) consumable electrode welding.

We claim:

1. An electric arc-welding process in which an alternating current is supplied to produce an electric arc between a welding electrode and a workpiece, each cycle of said current having a positive pulse and a negative pulse, wherein the improvement comprises, sensing with a sensing means a characteristic of the electric arc region, which characterstic changes as welding conditions at the electric arc change and said sensing means being adapted to provide a signal on the occurrence of said changes, and varying the ratio of durations of the positive and negative pulses with respect to each other in each cycle in response to said signal so as to provide optimum pulse durations of said pulses for said changed welding conditions.

2. A process as claimed in claim 1, wherein the ratio is varied by varying the duration of the positive pulses independently of the duration of the negative pulses.

3. A process as claimed in claim 1, wherein the ratio is varied by varying the duration of the negative pulses independently of the duration of the positive pulses.

4. An electric arc-welding process in which an alternating current is supplied to a welding electrode to produce an electric arc between the said electrode and a workpiece, each cycle of said current having a positive pulse and a negative pulse, wherein the improvement comprises monitoring with a sensing means a characteristic of the electric arc region to generate a signal from the sensing means on the occurence of changes in the welding conditions, and which characteristic changes as welding conditions of the electric arc change, comparing the generated signal with a reference signal in a comparing means to provide an output from the comparing means to an alternating current pulse width control means in response to any difference between the two signals, and varying the ratio of the durations of the positive and negative pulses with respect to each other in each cycle in response to said output to bring the varying generating signal and the reference signal substantially in balance.

5. A process as claimed in claim 4, wherein the polarity and duration of the initial pulse of current supplied to the welding electrode is arranged to be independent of the subsequent pulses of the same polarity supplied by the process under the control of the sensing means.

6. A process as claimed in claim 4, wherein the alternating current is of square-wave form.

7. A process as claimed in claim 4, wherein the ratio is varied by varying the duration of the positive pulses independently of the duration of the negative pulses.

8. A process as claimed in claim 4, wherein the ratio is varied by varying the duration of the negative pulses independently of the duration of the positive pulses.

9. A process as claimed in claim 4, wherein the welding electrode comprises a tungsten non-consumable welding electrode.

10. Apparatus for electric arc-welding from an alternating current, each cycle of said current having a positive pulse and a negative pulse, wherein the improvement comprises a power source means for providing a direct current supply, a reversing switching means to which the direct current is to be supplied, a control means for controlling both the switching position and the dwell time of the reversing switching means, so that in operation an alternating current of positive and negative pulses is supplied by the reversing switching means to a welding electrode, in which alternating current the ratio of the durations of the positive and negative pulses with respect to each other in each cycle may be varied by the control means, a sensing means for monitoring a characteristic of the electric arc region between the welding electrode and a workpiece to generate a signal on the occurrence of changes in the welding conditions, which characteristic changes as welding conditions at the electric arc change, a comparing means for comparing the generated signal with a reference signal and providing an output in response to any difference between the two signals to the control means, the said control means being so arranged that in operation in response to said output it alters the dwell time of the reversing switching means and thereby said ratio to bring the varying generated signal and the reference signal substantially in balance.

11. Apparatus as claimed in claim 10, wherein the power source means is adapted to provide a direct current supply which is floating with respect to earth.

12. Apparatus as claimed in claim 10, wherein initial pulse selection means are provided adapted to select the polarity and the duration of the initial pulse of current supplied to the welding electrode, said initial duration being independent of the duration of the subsequent pulses having the same polarity.

13. Apparatus for TIG welding from an alternating current for positive and negative pulses comprising a star-delta transformer for connection to a 3-phase supply, a 3-phase bridge rectifier connected to said transformer and adapted to provide open circuit voltages of 75v to 85v, a parallel circuit in the form of a parallel bank of thyristors to which the negative output of said rectifier is connected, commutating circuits adapted to control the commutating and firing of each thyristor in said parallel bank of thyristors, each thyristor having a resistor in series therewith so that the resistance provided by the parallel bank may be changed by altering the number of thyristors in open-circuit so as to change the quantity of current conducted by said parallel circuit, a reversing switch provided by two circuits in parallel, each circuit having a pair of thyristors in series, circuits to control the commutation and firing of the reversing switch thyristors so that alternate thyristors in the circuits are conducting or non-conducting together, the reversing switch being connected in parallel between the positive output from the rectifier and the negative output from the parallel circuit, means for connecting a welding electrode between one pair of thyristors in the reversing switch, means for connecting a workpiece between the other pair of thyristors in the reversing switch, polarity timing means adapted to provide a signal to the commutating circuit of the reversing switch to control the timing and dwell time of the firing of the thyristors in said reversing switch, said polarity timing means having variable time constants provided by a variable resistor and a capacitor, a sensing means for monitoring a characteristic of the electric arc to derive therefrom a signal from changes in the electric arc, amplifying means for amplifying said signal, filter means for removing background noise from said amplified signal, a differential comparing means for comparing said filtered signal with a reference signal and for providing an output signal to the polarity timing means related to the difference between said signals, said polarity timing means being adapted to change its variable time constants in response to said difference signal thereby to change the timing and dwell time of the firing of the thyristors in said reversing switch and thereby the ratio of the durations of the negative and positive pulses in each cycle with respect to each other until the filtered signal received by the differential comparing means and the reference signal are substantially in balance.

14. Apparatus as claimed in claim 13, wherein the welding electrode comprises a tungsten non-consumable welding electrode.

* * * * *